United States Patent [19]

Wilke

[11] 4,131,689

[45] Dec. 26, 1978

[54] PROCESS FOR THE PRODUCTION OF DRIED FOOD PRODUCTS

[76] Inventor: Gerhard Wilke, Holderlinweg 1, Heidelberg, Fed. Rep. of Germany

[21] Appl. No.: 780,914

[22] Filed: Mar. 24, 1977

Related U.S. Application Data

[63] Continuation-in-part of Ser. No. 312,985, Dec. 7, 1972, abandoned, which is a continuation-in-part of Ser. No. 55,622, Jul. 16, 1970, abandoned.

[30] Foreign Application Priority Data

Jul. 17, 1969 [DE] Fed. Rep. of Germany ....... 1936465

[51] Int. Cl.² .............................................. A23L 1/216
[52] U.S. Cl. .................................. 426/242; 426/445; 426/549; 426/550; 426/558; 426/637
[58] Field of Search ............... 426/242, 443, 549, 446, 426/450–468, 473, 496, 502, 503, 512, 517, 518, 558, 808, 637

[56] References Cited

U.S. PATENT DOCUMENTS

| | | | |
|---|---|---|---|
| 2,339,757 | 1/1944 | Baer | 426/242 |
| 2,414,580 | 1/1947 | Birdseye | 426/242 |
| 2,863,770 | 12/1956 | Speiser | 426/637 |
| 3,063,848 | 11/1962 | Van Gelder | 426/243 |
| 3,131,653 | 5/1964 | Bassano | 426/451 |
| 3,297,450 | 1/1967 | Loska | 426/637 |
| 3,379,538 | 4/1968 | Berry | 426/242 |
| 3,417,482 | 12/1968 | Willard | 426/637 |
| 3,418,142 | 12/1968 | Willard | 426/637 |
| 3,459,562 | 8/1969 | Beck | 426/637 |
| 3,502,479 | 3/1970 | Singer | 426/637 |

*Primary Examiner*—Raymond N. Jones
*Assistant Examiner*—Elizabeth A. Hatcher
*Attorney, Agent, or Firm*—Staas & Halsey

[57] ABSTRACT

A dried product and the process of producing same including kneading dough of known composition, adding water thereto, passing the dough through a series of rollers wherein each succeeding roller moves faster than its preceding roller to form a moist film on the last roller, removing the film, drying the so removed film and dividing the removed dry film into flakes.

14 Claims, 3 Drawing Figures

PROCESS FOR THE PRODUCTION OF DRIED FOOD PRODUCTS

This application is a continuation-in-part of application Ser. No. 312,985, now abandoned, filed Dec. 7, 1972, which is a continuation-in-part of application Ser. No. 55,622, filed July 16, 1970 now abandoned.

BACKGROUND OF THE INVENTION

It has been a part of the prior art to facilitate the preparation of food in the kitchen in such manner that products are offered to the housewife already prepared and ready for cooking. Products of this type which have been known the longest are noodles and dried soups.

Formerly the noodles were prepared fresh from wheat farina or flour and eggs, and the drying of the goods was made only for the requirement of a short time period.

Through mass manufacture, namely through the shaping and drying of the noodles, they merely need to be placed into boiling water by the consumer, as a result of which the noodles will be ready for consumption after a longer or shorter period of cooking.

Dried soups which are ready for cooking, and which have no fixed shape and therefore are in the form of a powder, require a somewhat more cumbersome preparation since they have to be stirred at first or made into a dough before they can be placed into boiling water.

During the past few years, dried preparations or dried products have increased greatly, from which the housewife can produce dumplings. These known preparations made mainly from raw or boiled potatoes represent, of course, a great relief for the housewife in comparison to the preparation of dumplings in the household which had been customary heretofore. Nevertheless, even in the case of these dried preparations, a number of steps are required in the household to obtain potato products such as dumplings. The preparation time is also considerably longer than in the case of the above-mentioned products.

The natural fresh potato, during preparation in the kitchen shows, in the form in which it can be consumed, considerable variations, depending on the process used. If the potato as a whole is boiled in water, then the starch granules will swell in the preserved cell bonds. The water from the cells that can be filtered away and that becomes visible after cutting the raw potato seems to have disappeared and was used up for the maximum swelling of the starch granules inside the cell, If however, the raw potato is comminuted, then one will obtain a thin, pasty mixture of individual exposed starch granules, cell fragments and fibers, as well as free liquid from the tissue. If this watery mash is heated to cooking temperature, then one will obtain a gluetinous tough product, which differs completely from a whole boiled potato in its physical nature and its organoleptic structure, although in both cases all the substances of the potato are present in the same quantitative composition.

Thus, it is apparent that the shape, appearance, structure and taste of the prepared product depend upon in what state the potato starch is available after preparation. The starch can be in its native state outside the cell bond. The starch can furthermore be swelled outside the cell; it can be swelled inside the cell and it can be unswelled inside the cell. Each of these four main states of appearance of the starch results in structural differences in the finished product. Several processes have been known in the prior art to obtain durable products from dried potatoes. These processes are discussed below in terms of three principal types of processes.

In a first process type, larger pieces of potatoes in the form of slices, cubes, chips, etc., are dried. The initial material is the whole potato. After peeling, the potatoes are cut to the desired shape (slices, cubes, pegs, chips) while interpolating a blanching step, and are subjected subsequently to a drying process, typically on trays, belts or vacuum drums. These products result, after "reconstitution" while absorbing water and subsequent or simultaneous heating, in sliced or cubed potatoes, potato pegs or chips, which in their shape resemble the products prior to drying. Only after cooking are they in a consumable state. When observing their fine microscopic structure, one can recognize that the large majority of the starch grains lie within the cells and that the starch similarly as in the case of a freshly boiled potato has a maximum swelling. The individual cells show the original, undistrubed cellular bond which is injured and disturbed only at the cuts. Here, quantities of starch have emerged from the cells and are glued together outside the cells.

The second process type of the durable dried potato products starts out from mashed potatoes. In this case, the potato, after paring, is not only blanched but it is heated, with the cell bonds intact, up to the maximum swelling of the grains of starch. Subsequently, the potato is transformed in a fine mash in different ways. The mash, in the ideal case, is a so-called unicellular mash, i.e., each cell lies by itself, but the still unhurt cellular membrane encloses the grain of starch swelled to the maximum. This mash is dried either on a roller drier, a vacuum drier or a spray drier.

When drying on a roller drier, one will obtain bright yellow, dilute homogenous flakes which after dissolution in hot water or milk result in a loose potato puree. While drying in the vacuum or when spraying one will obtain a powdery product from the original mashed potatoes, which after mixing with hot water or milk again results in a potato puree.

These dried products may be changed into porous granules, with accelerates dissolution again to a potato puree after addition of hot water or milk in the sense of an instantaneous effect. In any case, after "reconstitution" the well known, typical potato puree develops.

Microscopically, the roller dried flakes as well as the powder and the granulate consist of individual cells with swelled starch.

The swelling of the starch proceeds to the point of gluing together. When observed with a polarization microscope, the double refraction phenomenon with the characteristic spherical cross is omitted. The individual grains of starch are greatly swelled and in most cases considerably deformed. If such a preparation is dyed, the individual swelled areas of the grains of starch can be recognized separated from one another. The tissue bonds have dissolved for the great part into individual cells. Groups of cells with a common cell wall consisting of two to four cells are rare. The individuals cells are from round to oval; the outside surfaces of the cell fragments are rounded. In the dry flakes, the rounded surfaces of the cells with their points of contact adhere to one another. After addition of water during reconstitution, the individual cells separate from one another, so that a unicellular puree is in there again.

More recently, a third, basic process has been added in order to obtain durable, dried potato products which are intended above all for consumption in the dry state. In the case of these products, dry products ground into powder or grits (as described in the first process type above), with or without addition of pure potato starch or cooked, dried potato products (as described with regard to the second process type), are placed into an extruder with addition of a small quantity of water, mostly some salt and suitable emulsifiers, whereby the mass becomes homogeneous and is heated as a result of the compressing effect of a compression extruder. A completely homogeneous, extremely tough dough develops and is extruded through a slit shaped or annular nozzle into a strip or some other form of a strand. This strip or strand is cut into small strips by a rapidly rotating knife. The cut pieces after cooling show a smooth to slightly irregular, rough surface; they are translucent and look like a completely homogeneous product.

These cut pieces represent an intermediate product. For final processing they usually are put in hot oil, in very hot air, or under an ultrared radiator. As a result of the sudden strong heating, the water still in the product is suddenly evaporated. Because of the extremely tough and extremely homogeneous structure of these products, the developed steam cannot escape. Steam bubbles develop, which expand the dough, so that a honeycombed, foamy, loose and crunchy structure develops with very low specific gravity, which can be consumed without any further processing.

The premise for the success of this process is a homogeneous cell and tearfree basic structure, so that the stream cannot escape before expansion to the outside. Microscopically, one can recognize a completely homogeneous mass with only a few individual cell fragments. No structures of grains of starch can be found any longer. Only by dying the preparation for example with iodine, is it possible to determine, that one is dealing with starch. No grains of starch are recognizable anymore, no matter whether swelled or unswelled, and no unhurt cell elements as well.

It has been suggested to obtain larger, cut resistance compact bodies such as dumplings/ball from durable dried potato products. In this case, one proceeds in such a way that dried products, as described above with regard to the first process type, are ground into a gritty powder, whereby powder from products, as described with regard to the second process type, can also be added partly. These mixtures must be wetted first of all with water at a ratio of 1 to 4 and they require a swelling time of 20 to 25 minutes. After that, a dumpling is formed from the strongly swelled mass, it is put in hot or boiling water, whereby a cooking time of between 20 and 30 minutes is required. The entire process, together with preparation time, consequently requires at least more than 50 to 60 minutes.

If one wishes to try to shorten the preparation time of dumplings made from such dried material and to put the products, as described with regard to the first and second process types, or the ground products (no matter whether in the shape of powder, granules or flakes) into a spherical pouch in order to obtain a dumpling by immersion of this pouch into hot or boiling water without previous swell time and deformation, then one will find the following results. Whenever pieces, cubes, slices or chips are put in such a pouch and this pouch is allowed to remain in boiling water until the contents are cooked and then the pouch is opened, the individual, reswelled, cooked pieces of potato drop out loosely and without connection, even if the pouch was filled tightly.

Whenever the coarse, powdery product, which after previous moistening until doughy, swelling time and deformation, resulting in a cut resistance dumpling in hot or boiling water, is put dry in such spherical pouches, and whenever these pouches are put into boiling or hot water, the border layers of the contents of the pouch are wetted rapidly. a mucous, jelly-like mass of 3 to 5 mm thicknes develops along the border layers of the pouch contents. The largest part of the contents of said pouch remains completely dry and powdery.

If, finally, flakes or porous granules, as described with respect to the second process type, are filled loosely into spherical pouches, then after placing of these pouches into hot or boiling water, the moisture will indeed penetrate to the inside of the pouch. However, a potato puree and not a dumpling will develop from these cooked dry flakes or granules. If the filling of the pouch is increased, then it is only the border layers of the contents again which are moistened with water after immersion of the pouch, and the largest part of the contents remains completely dry.

If one tries to fill the pouch perhaps with small cut, extruded pieces of a strip, as decribed with respect to the third process type, and allows the pieces to swell in hot or boiling water and thus possibly to obtain a compact dumpling, the resultant product is a tough, mucous, unshaped, unpalatable mass, which has little similarity to a dumpling.

In summary, for the preparation of dumplings from masses, the latter must be mixed or kneaded with a precisely measured quantity of water. Subsequently, these masses must rest for a certain time in order to swell. The real cooking time of the dumplings which follows is the same as in the case of dumplings customarily produced previously in the household.

Because of the precise dosing of the water that is to be added, it is furthermore generally necessary each time to use an entire package of the dried mass. For a household containing only one person, this method of preparation is unsuitable and relatively expensive.

Furthermore, a process for the production of a dried intermediate product from which so-called potato chips are made by putting the intermediate product in hot oil (British Pat. No. 998,603), also constitutes part of the prior art.

We should like to refer to German published application No. 1,049,685, British Pat. No. 603,074, as well as U.S. Pat. No. 2,954,295, as belonging to the further status of the prior art.

The dried products for making dumplings, known hitherto, consist partly of flour containing parts and partly of fibery parts mixed with the former, the fibery parts being grated. Partly, substantially boiled potatoes are processed on roll driers under suitable conditions of pressure in the vacuum into scaly dry products, which during processing, immediately swell into a more or less solid paste. Whenever these customary dried products are filled into a pouch or into some other receptacle permeable by water and are then put immediately into cold or boiling water in order to obtain a dumpling without mixing into a dough, then the border layers will swell quickly, are glued (pasted) together and constitute a dense wrapping jacket around the still dry particles on the inside; unfortunately, they cannot absorb any water whatever in this process. In this way, it is not possible therefore, to produce a dumpling by putting a dried product located in a pouch (into water).

SUMMARY OF THE INVENTION

The object of the present invention is a dried product made of potatoes or other starch containing and/or albumin containing starting materials, which, by insertion of a pouch or some other water permeable container filled with finished dumplings, can be made to swell for the production of dumplings characterized in that the dried product consists of flakes or some other small particles which with water form a dough, the surfaces of said particles being concentrated (condensed) in a horn-like manner.

The invention furthermore relates to a dried product made of potatoes or of some other starch containing and/or albumin containing starting substances which is characterized in that it consists of flakes which can be made into a dough with water and with a condensed surface, which is subjected to a kneading process, subsequently granulated, then dried and expanded with the development of pore holes.

Furthermore, the present invention refers to the production of the above-disclosed dried products.

This new process for the production of dried products is characterized in that a dough is kneaded from the starting materials known per se, with the addition of such a quantity of water that after the passage of this dough through a rolling mill with roller lead it will from a moist film on the last roller, which subsequently is transferred by way of a removing knife to a belt and which thereupon is dried, whereby through the sticking together of the fine parts and fibers of the material web, a horn-like condensed surface with a scaly structure is obtained. By a rolling mill with lead is meant a rolling mill having several rollers in which each following roller moves faster than the preceding roller.

DESCRIPTION OF THE PREFERRED EMBODIMENT

Figure 1:
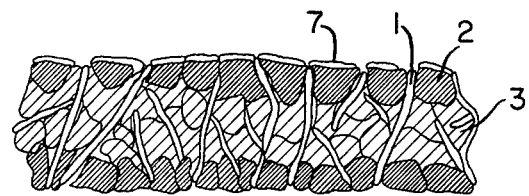
FIG. 1 is a cross-sectional view of a single flake out of which the dried food product is made.

The dried products according to the present invention, made of potatoes or other substances suitable for the production of dumplings, for example albumin containing starting substances, makes possible a method of production of dumplings in the household which offers more advantages over the methods known hithherto.

The present dried products for the production of dumplings consists partially of portions of flour and partly or portions which are fibrous and mixed with the former, such as develop in the case of coarse grating of potatoes. Above all, boiled potatoes will partially be converted on roller driers under standard pressure conditions or under vacuum into scale-shaped dried products, which when made into a dough will immediately expand into a more or less solid pap. In one fills these customary dried products for the production of dumplings into a pouch or some other container permeable by water and then places it immediately into cold or boiling water in order to obtain a dumpling without preparing a dough, then the border layers of the dried pproduct will quickly swell, agglomerate and form a tight coating around the still dry particles which lie inside, which are thereby unable to absorb any amount of water, which of course is a disadvantage.

In this manner therefore it is not possible to produce a dumpling through insertion of a dried product located in a pouch.

This problem is solved with the use of the dried product of the present invention; the dried products according to the invention indeed make it possible to produce a solid dumpling that can be cut and is compact, by mere insertion of a pouch or some similar water permeable container, into which said dried product has been filled, into hot or boiling water.

In order to achieve this desired effect, the dried products, for example dried potato products, are changed in regard to their surface in a special manner. As previously explained, these dried products according to the invention customarily have the shape or flakes, especially coarse flakes, or some similar shape.

The new dried products are produced according to the invention in such manner that they are obtained to be sure in a preferably coarse flake shape, whereby, however, the swelling of the flakes in water is delayed by a few seconds as a result of a special condensation process and condensation effect on the surfaces of the flakes. Through this condensed flake shape and through the somewhat delayed swelling, the decisive prerequisite will be created that, in the case of insertion into hot or boiling water, the entire contents of the pouch will immediately be wetted and sufficient water will be available at all places in order to assume simultaneous swelling of all the contents of the pouch. The pouch has a spherical shape and is produced by welding from a foil fleece. First a hose develops with a diameter of 4-5 cm, and is taken up by a clamp at intervals of 5 cm and welded. The material of the pouch illustratively comprises a cellulose fiber which is matted and interlaced. In addition, the pouch has a sieve like pattern of holes, so that water can enter easily.

In this manner it is possible to produce a dumpling from the dried product according to the invention by mere insertion in hot water.

The details of the process according to the invention will be described in more detail by specific examples. In summary, it may be said that the new dried products fulfill two essential prerequisites which are necessary to produce the dumpling by mere insertion of a water permeable pouch or other container filled with the dry product.

The first necessary prerequisite is a coarse flake or a somewhat irregular granular structure of the dried material, as a result of which an immediate penetration by water up to the middle of the pouch or container is made possible.

The second necessary prerequisite is a certain delay in the swelling of the dried material, so that the border layers of the pouch filled with the dried material upon wetting with water will not swell too quickly and will not close but will retain a porous structure for such a length of time that the water penetrates to the center of the contents of the pouch or container.

Furthermore, the process of making a dough with water and with the disclosed dried products made of potatoes or some other starch containing and/or albumin containing starting substances comprises subjecting them to a kneading process, granulating them subsequently, drying them and expanding them finally with the development of pore holes. As a result, on obtains a dried product available in the form of a granulate and which can be swelled (expanded) through insertion in water. After expansion, the diameter of the granulte is illustratively 5–6 mm, and the pores thereof illustratively in the range of from 0.1 – 0.3 mm.

Figure 2:
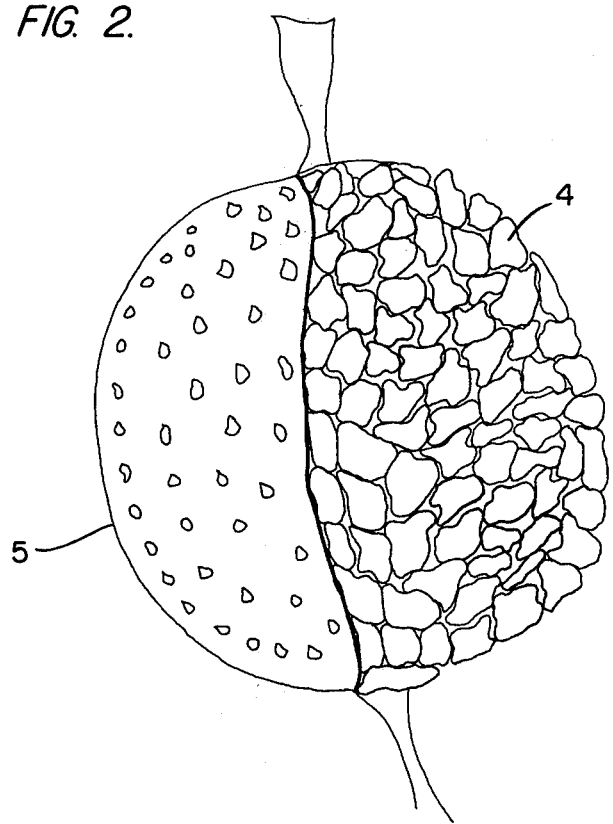
FIG. 2 is a top plan view of the dumpling illustrating a portion of an outer paper layer which holds together the particles thereof.
Figure 3:
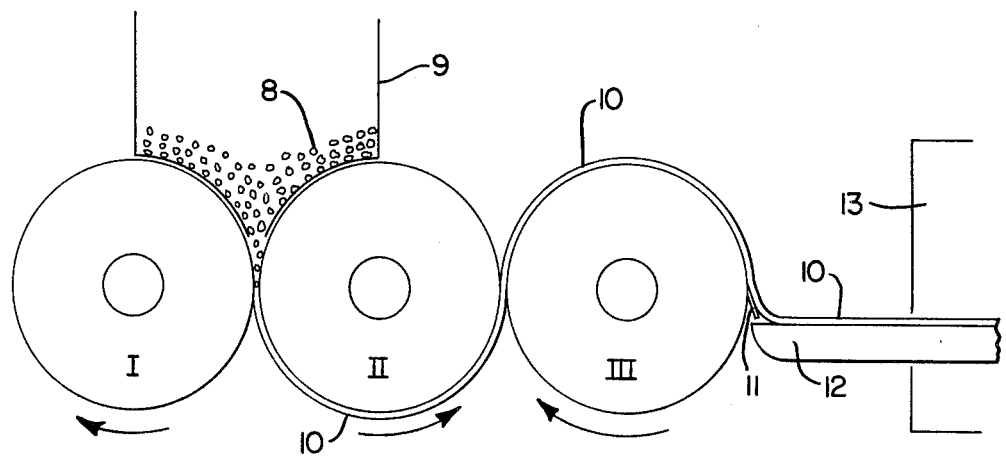
FIG. 3 is a schematic diagram illustrating the rollers for forming the film and pressurizing the surfaces thereof to produce outer layers of greater density than the remainder of the film and to impart greater fibrous characteristics to the remainder of the film, the blade for scraping the film from the last roller and the conveyor for transporting the flakes to the drying oven.

Certain of the general principles of the present invention are illustrated in the drawings although the essence of the invention will be apparent from the examples provided hereinafter. FIG. 1 illustrates the cross-section of a single flake wherein the reference numeral 1 designates the potato fibers from the raw gratings, reference numeral 2 designates the granulate particles of the outer layer that have been condensed (compacted), reference numeral 3 designates the granulate particles of the interior that are of less density than the outer layer, and reference numeral 7 designates the horny surface of the flake. FIG. 3 illustrates schematically the series of rollers I, II, III into which the inhomogeneous mixture 8 is fed through hopper 9. After the requisite thin film 10 is formed on the rollers it is scraped off of roller III with the blade 11 onto the drying belt 12 for transport to the drying oven 13. FIG. 2 illustrates the dumpling that is formed of the swollen, interconnected flakes 4 (illustrated in FIG. 1), the reference numeral 5 designating a part of the outside wrapping which confines the flakes. See Example 8 for a description of the process with reference to the drawings.

EXAMPLE No. 1

100 kg peeled and blanched potatoes are grated coarsely and freed of about 50% of their water content through subsequent centrifuging. The size of the potato gratings is illustratively 8–10 mm in length, 1–2 mm in width, 0.5–1 mm in thickness. The grating of potatoes is accomplished on a suitable grating machine such as manufactured by the Alexanderwerke firm. 10 kg farina, 300 g common salt, as well as possibly spices, are added to the solid centrifuugal residue. This mass is worked briefly in a kneader; illustratively, the mass is kneaded for 4 minutes in a slowly revolving planetary kneader at 8 rpm. The kneader operates for approximately 3 minutes, and the mass is shaped in the kneader into small modules of 2–4 cm diameter, irregularly shaped and of various sizes. Subsequently, the modules are fed to a rolling mill which operates preferably with such an arrangement of rollers in which every succeeding roller moves faster, that is to say which has a lead, than the preceding roller. In order to reduce the thickness of a rolled out sheet, only rollers can be used, both of which are synchronized, i.e., they have no differential speed, so that an unravelling effect will not occur. In this manner one obtains a film which is approximately 1 mm thick and which can be scraped off from the support with a knife and can be transferred to a drying belt. The drying is accomplished by means of hot air of a temperature of 100°–120° C, for a period in the order of 15 to 17 minutes.

This condensation suffices to bring about the above described progressive characteristics, for example, the desired delay in swelling. As will be described in detail later, during drying of the material, the condensation develops a horny surface due to the presence of the starch paste outside the cell, which condensation of the surface causes the delay in swelling. Moreover, the individual cell elements are agglutinated, so that the flakes will have a sufficient resistance to fracture.

After conclusion of the drying, the mass is divided into flakes of a size of 2 to 6 mm through slight stirring in a collecting vessel, which flakes are then removed in a manner known in itself.

EXAMPLE No. 2

70 kg dried end product, produced according to example 1, is mixed with 20 kg farina made from hard wheat, 10 kg dried albumin (egg whites) and 0.5 kg common salt. Then, 25 kg water is added to this mixture and the mass which develops is kneaded for 10 minutes. Subsequently, granules or cubes with a length of edge of 2 to 4 mm of almost round configuration are produced from this mass in a suitable granulating device such as Eirich granulator. The granules or cubes obtained in this manner are placed in a vacuum shelf drier, in which drying is accomplished at a temperature of 110° –120° C and a technical vacuum of 80%. Simultaneously, steam was blown in during the drying. After a drying period of 14 to 15 minutes the dried expanded granules having pore holes are removed.

EXAMPLE 3

Peeled, blanched potatoes are grated coarsely and dried in a manner known per se.
  100 kg dried gratings are mixed with
  80 kg coarsely ground, dried and disembittered cassava root,
  2 kg common salt and
  2 kg dried egg white.
To this mixture
  70 kg of water is added, and the mass is kneaded in a kneader for 3 minutes.
The further process is as described in example 1.

EXAMPLE 4

Peeled and well stewed potatoes are cut in slices of 2-3 mm thickness. These slices are dried on a belt or tray drier in a manner known per se. The dried product is ground to coarse grits. The following is mixed:
  100 kg of these potato grits
  100 kg dried potato gratings (as described in example 3)
  3 kg common salt
  20 kg finely comminuted whole soy flakes
  500 g pot herbs seasoning
  60 kg water.
One proceeds as described in example 3.

EXAMPLE 5

100 kg coarse grits made from boiled potatoes, as described in example 4 is mixed with
  55 kg of well stewed, peeled, ground potatoes
  500 g whole egg powder
  200 g ground nutmeg
  300 g dried parsley
  1.5 kg common salt.
Further processing as described in example 3.

EXAMPLE 6

100 kg dried product, made as described in example 3, is kneaded with
  26 kg water and subsequently is put into a granulation cylinder.

The granules obtained are disposed into an autoclave. The air in the autoclave is displaced by introduction of $CO_2$. After closing of the autoclave the pressure is increased to 10 atmospheres with simultaneous heating to 60°.

The excess pressure is released in the manner of an explosion by means of a quick acting gate valve.

The expanded porous granules of irregular structure are dried in a manner known per se.

EXAMPLE 7

120 kg coarsely ground, dried and disembittered cassava root
60 kg wheat grits
2 kg common salt
8.5 kg dried egg whites
0.5 kg of a mixture of plant spices are premixed
68 kg water are added to this mixture.
The mass is kneaded in a kneader for 5 minutes.
Further processing as in example 1.

EXAMPLE 8

60 kg of raw peeled potatoes which had been pre-blanched by 7 minutes of heating in water of 90° C, are processed by a potato grating machine into so-called gratings, whereby the individual gratings have a width of 1.5 mm, a length of 10 mm and a thickness of 1.5 mm.

50 kg of the gratings, produced as above, of raw pre-blanched potatoes, with 18% of dry substance, are placed into a centrifuge and by centrifuging the water of the fruit are reduced to a weight of 25 kg.

These centrifuged gratings now receive 9 kg of dry substance and 16 kg of water. The 25 kg of gratings centrifugate are now mixed with 55 kg of a dry granulate, which was made from blanched potatoes. The production of this granulate is as follows: the raw peeled potatoes are put into water at 90° C and left in it for 7 minutes. Then they are sliced in a known manner with a slicing machine to 4 mm thick slices. These slices are dried on a belt, feeding in hot air of 70° C. The dried slices of potatoes are then ground on a beater mill to an irregular granulate with a grain size of between 0.5–2.5 mm. To the above mixture of moist centrifugate and dry granulate, now is added:

3.0 kg of pulverized soy albumin
0.5 kg of hydrogenated peanut-fat with a melting point of 37° C, an emulsifier which consists of monoglyceride of the palmitic acid,
1.2 kg salt
0.8 kg mixture of spices, consisting of rosemary, celery, ground pepper and green paprika.

This mixture of altogether 86 kg is pre-mixed in a worm mixer for 5 minutes. The pre-mixed product is put into a blade kneader and 15 kg of water at 20° C are added. The mass is kneaded for 6 minutes at 36 revolutions/minute of the blade of the kneader. After 6 minutes the kneaded product is removed.

This product then is present in the form of a crumbly dough of fibrous lumps (5–20 mm). The lumps have an irregular inside structure because of the variable swelling of the granulate, which moreover is permeated by the moist gratings. The swelling process has taken place during the 6 minutes of kneading time. The smaller granulate particles are more strongly swelled than the larger ones, since the migration speed of the swelling water is always the same, and the smaller granulate particles are completely moistened through during the 6 minutes, the larger granulate particles are only half moistened through.

The product is put on a roller arrangement as in drawing FIG. 3, which is developed such that the roller I revolves with 20 rpm, the next following roller II with 35 rpm and the third roller III with 58 rpm.

The width of the rollers is 800 mm, the diameter is 400 mm.

The rollers are produced from chillcast steel with a tempered surface ground and polished to a high polish.

The roller I is pressed against roller II at a pressure of 35 kg/cm$^2$ by means of a hydraulic pressure arrangement.

Roller III is pressed against roller II at a pressure of 63 kg/cm$^2$. An arrangement, which permits the blowing of hot air from nozzles onto the surface of the roller III, is attached above the roller III (not shown). After starting the rollers and after corresponding contact pressure, the inhomogeneous dough mixture 8 is put onto the roller I.

As a result of the revolution of the rollers the crumbly dough of fibrous lumps 8 reaches the gap between rollers I and II; because of the above described leading of the roller II, as compared to roller I, a film is formed on roller II, which is irregular as shown in FIG. 1.

This film is transferred from roller II to roller III. Because of the higher contact pressure of the roller III, the thickness of the film decreases to 1.5 mm.

Since the rollers I, II, III are ground with a high polish, the film is smoothed on its top side at a thickness of 0.1–0.15 mm, and the particles 2 are additionally condensed (compacted) as compared to the particles 3 of the main mass of the film.

Because of the shearing effect resulting from the differential speed of the rollers I, II, III, the mass of the film remains in an irregular structure.

Hot air is then blown onto the previously described smooth surface of the film whereby the outside layer 7 of the film assumes a horny consistency as compared to the multi-fibrous inside portion.

With the help of a scraping blade 11, which is positioned tangentially against the roller III, the film is lifted off and transferred to a conveyor belt 12. This belt 12 passes through a drying oven 13 where hot air at 65° C is blown over the belt 12. After conclusion of the drying process, the film is placed into a slowly running worm agitator, wherein it decomposes into small irregularly shaped product flakes 4 which are 3 × 4 × 1 mm in dimension. The flakes 4 are put into a pouch or wrapping 5, as illustrated in FIG. 2, which is in the shape of a sphere (ball), and which after the initially described treatment in water swells up into an edible, cuttable dumpling.

Thus, it is possible in accordance with the teachings of this invention, to produce dumplings by mere immersion of a spherical pouch filled with a dried flake produced as described above, in hot or boiling water to provide an improved dumpling, with a shortening of the preparation time of 50 to 60 minutes to 7 to 12 minutes.

Significantly, flakes which in their structure are strongly inhomogeneous and in which the starch is present in four possible forms, and which have on their surface a very thin, horny condensation, are eminently suited in accordance with this invention for the production of dumplings in an instantaneous pouch process. If such flakes are put into spherical, water-permeable and cook-resistant pouches, then the horny condensation of the surface of the flakes causes a delay in swelling of from 5 to 15 seconds. This time suffices, so that the hot or boiling water will moisten all flakes of the pouch evenly and practically simultaneously and that the water can penetrate to the center of the pouch. The consequence of the uniform moistening is that all flakes are heated to the gluing temperature within 5 to 15 seconds. As a result of the rapid swelling of all flakes, further penetration by the water is prevented within from 30 to 45 seconds, so that there is no excess of available swelling water present.

As a result of the increase in volume during swelling, first of all the loosely lying flakes are compressed tightly, since an expansion beyond the predetermined volume is not possible because of the spherical wrapper. Within 3 to 5 minutes, the swelled flakes are glued together into a "loosely-firm" mass, whereby the resultant mass obtains a structure which is typical for a dumpling and which is not completely homogeneous. Zones of somewhat more firm consistency alternate with those of a somewhat more loose consistency, whereby as a result of this variable structure, the typical dumpling character develops which is felt to be just right when breaking the dumpling open with the fork. Significantly, this typical structure of a dumpling will be obtained whenever the individual flakes already have a strong inhomogeneity.

For comminuting of rollable products, multiple crushing rollers with so-called lead, have already been used, whereby in each case the next following roller has a higher r.p.m. than the preceding one. The characteristic of the use of the prior art multiple crushing rollers with lead is the making of a product which is obtained in a paste-like, pulpy or even in a liquid state. The rolled material is removed from the last roller by means of a scraper and is fed to the receiving container by way of a discharge plate. Dough-like preparations with relatively low water contents are rolled out with rollers with equal speed into ever finer strands or sheets. If such products are made to pass through a multiple roller system with lead of the rollers, then one will obtain after removal of the substance and with the present methods either a thick tough paste or a lumpy, coarse grained mass.

While the transfer of a rolled out sheet of dough which has passed through two rolls with equal roller speed, to a receiving or conveying belt causes no difficulties, such a removal of such masses from one roller system which operates with rollers with lead may be difficult.

However, in accordance with the present invention, if the water contents of the rolled goods put on the rollers of a roller system with lead, are reduced to a moisture of 15 to 50% depending on the characteristics of the individual product, then a fine grinding will be avoided, and a comminution by separating into fibers takes place with simultaneous condensation on the surface, whereby an inhomogeneous structure of the mixture of roller goods develops or remains intact with simultaneous condensation on the surface of the rolled goods. In this manner, a film of 1-1.5 mm thickness develops on the topmost roller.

This film can be transferred to a belt in the following manner. Instead of the standard scraping blade, a very thin, narrow knife of 15 mm width is pressed against the last roller. 2 to 3 mm below the edge of this knife and at a distance of only 1 to 2 mm, a belt is brought up, which is guided around and over a narrow, slightly rounded edge of 2 mm thickness. In this manner, it is possible to transfer the film to the belt, as it is on the last roller, without deformation accomplished in the process of comminution used hitherto on multiple roller system with lead.

Following the succeeding drying, the film on the belt can be separated into irregularly formed flakes with a diameter of 3 to 10 mm and a thickness of 0.8 to 1.3 mm by light stirring because of its inhomogeneous structure which already contains preformed fracture zones. The surface of the flakes is slightly lumpy and somewhat corrugated. The structure of the flakes shows an irregular make-up. Areas of 1 to 2 mm size alternate, which have a whitish fibrous character, with those which seem more translucent and denser, whereby the whole is covered by a thin film, partly visible only with a microscope, of horny, dried-out glued together starch. The portions of starch of the flakes are present in various forms. About 40% of the starch appears as completely intact grains of starch, which are not or only very little swelled with a clear layering of potato starch, with formation center and double refraction appearance in the polarization microscope. These grains of starch, in most cases, lie in the form of smaller, fibrous particles of tissue with a series of 12 to 15 cells in the longitudinal direction and only 2 to 3 cells in the transverse direction. The edges of the cells are intact for the greater part. The individual edges of the cells are torn open.

About 10% of the starch consists of individually lying, strongly swelled grains of starch with a round or oval shape. In the case of these grains of starch, there no longer is any layering or double refraction. In about 50% of individual cells or particles of tissue, the grains of starch are strongly swelled and irregularly deformed. These cells with strongly swelled starch are disposed in narrow, spindle-shaped bundles. Finally, irregularly formed starch paste parts also occur, which lie outside of the individual cells or cell walls. This substance represents the cement, which holds the various structural elements together and which causes the delay of the swelling process by the drying out on the surface of these diverse cell elements.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

I claim:

1. A process for the production of dried food products having an irregular, flake-like shape and a thin film of horny, dried-out glued together starch, and which are expandable in water after an initial delay to form a dumpling, said process comprising the steps of:
   a. forming individually distinct particles from an ungelatinized base mixture containing material selected from the group consisting of potatoes, and mixtures of starch based products and albumin;
   b. adding water to said individually distinct particles and kneading the same for a period of time sufficient to form an inhomogeneous mixture wherein the integrity of said distinct particles is preserved;
   c. forming said mixture into a film by subjecting said inhomogeneous mixture to single rollers arranged one behind the other in series and operating at differential speeds, each succeeding roller moving faster than the preceding roller, such that said mixture passes from part of the surface of one of said single rollers to part of the surface of another of said single rollers adjacent thereto thereby pressurizing the surfaces of said film to produce outer layers of greater density than the remainder of said film and imparting greater fibrous characteristics to said remainder of said film than to said outer layers thereof, said differential speeds of the rollers causing a shearing effect on said mixture so that the mass of film remains with an irregular structure;

d. removing said film from the last roller;

e. drying said film to further increase the density of said outer layers; and f. separating the dried film into flake-like particles.

2. The process as claimed in claim 1, including establishing the water content of said individually distinct particles to be in the range 15–60% by weight with respect to to total weight of said particles by adding water to said particles while said particles are being mechanically treated.

3. The process as claimed in claim 1, wherein said film is transferred from the last of said rollers by a scraping knife.

4. The process as claimed in claim 3, wherein said scraping knife has a width in the order of 15 mm and is disposed against the last of said rollers.

5. The process as claimed in claim 1, wherein said film as it passes from the last of said single rollers has a thickness in the range 1 - 1.5 mm.

6. The process as claimed in claim 1, wherein said drying is accomplished by means of hot air directed onto said film at a temperature in the range of 100°–120° C.

7. The process as claimed in claim 1, further including the steps of:

a. forming the resultant kneaded mixture of steb b) into granules; and b. drying and expanding said granules.

8. The process as claimed in claim 1, wherein a component selected from the group consisting of grits, semolina, the dried whites of eggs, whole eggs and salt, is added to said particles prior to mixing with water.

9. The process as claimed in claim 8, wherein said granules are expanded in a microwave field.

10. The proces as claimed in claim 8, wherein said drying of said granules is carried in a vacuum.

11. The process of claim 10, wherein simultaneously to said drying under vacuum, said granules are exposed to steam whereby they are expanded to form porous granules.

12. The process as claimed in claim 1, wherein said separating of the dried film into flake-like particles is accomplished by the slight stirring of said film in a collecting vessel.

13. A process as claimed in claim 1, wherein said rollers comprise first, second and third rollers, rotating at speeds of substantially 20, 35 and 58 revolutions per minute, respectively, and wherei said first roller engages said second roller at a pressure of substantially 35Kg/cm$^2$ and said third roller engages said second roller at a pressure of substantially 63Kg/cm$^2$.

14. A process a claimed in claim 1, wherein said kneading is for approximately 6 minutes.

* * * * *

UNITED STATES PATENT AND TRADEMARK OFFICE
CERTIFICATE OF CORRECTION

PATENT NO. : 4,131,689
DATED : December 26, 1978
INVENTOR(S) : GERHARD WILKE

It is certified that error appears in the above-identified patent and that said Letters Patent are hereby corrected as shown below:

Col. 1, line 50, "cell, If" should be --cell. If,--;

Col. 2, line 20, "undistrubed" should be --undisturbed--;

Col. 2, line 60, "individuals" should be --individual--;

Col. 2, line 66, "in" should be --is--;

Col. 3, line 31, "stream" should be --steam--;

Col. 4, line 7, "rapidly a" should be --rapidly. A--;

Col. 5, line 28, "from" should be --form--;

Col. 5, line 58, "hithherto" should be --hitherto--;

Col. 5, line 61, "or" should be --of--;

Col. 5, line 67, "In" should be --If--;

Col. 7, line 5, "on" should be --one--;

UNITED STATES PATENT AND TRADEMARK OFFICE
CERTIFICATE OF CORRECTION

PATENT NO. : 4,131,689

DATED : December 26, 1978

INVENTOR(S) : Gerhard Wilke

It is certified that error appears in the above-identified patent and that said Letters Patent are hereby corrected as shown below:

Col. 7, line 8, "granulte" should be --granulate--;

Col. 7, line 43, "centrifungal" should be --centrifugal--;

Col. 13, line 19, delete "to" (first occurrence);

Col. 14, line 14, "proces" should be --process--;

Col. 14, line 27, "wherei" should be --wherein--.

Signed and Sealed this

Twenty-second Day of May 1979

[SEAL]

Attest:

RUTH C. MASON
Attesting Officer

DONALD W. BANNER
Commissioner of Patents and Trademarks